(12) United States Patent
Tachibana et al.

(10) Patent No.: US 11,101,613 B2
(45) Date of Patent: Aug. 24, 2021

(54) LASER DEVICE AND PROCESSING DEVICE

(71) Applicant: MITSUBISHI HEAVY INDUSTRIES, LTD., Tokyo (JP)

(72) Inventors: Takahiro Tachibana, Tokyo (JP); Takehisa Okuda, Tokyo (JP); Yasuyuki Fujiya, Tokyo (JP); Shuho Tsubota, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 121 days.

(21) Appl. No.: 16/412,565

(22) Filed: May 15, 2019

(65) Prior Publication Data

US 2019/0363503 A1     Nov. 28, 2019

(30) Foreign Application Priority Data

May 23, 2018    (JP) ............................. JP2018-098395

(51) Int. Cl.
*H01S 3/00*        (2006.01)
*G02B 7/02*        (2021.01)
*B23K 26/046*     (2014.01)

(52) U.S. Cl.
CPC ............ *H01S 3/005* (2013.01); *B23K 26/046* (2013.01); *G02B 7/028* (2013.01)

(58) Field of Classification Search
CPC ................ G02B 7/028; G02B 19/0047; G02B 19/0014; G02B 26/06; B23K 26/211; B23K 26/706; B23K 26/0643; H01S 3/005; H01S 3/0401; H01S 3/0604; H01S 3/0941; G03F 7/70058; G03F 7/70775; G03F 7/70841; G03F 7/10883; G03F 7/70933
See application file for complete search history.

(56) References Cited

U.S. PATENT DOCUMENTS

2001/0035942 A1\* 11/2001 Hara ................... G03F 7/70775
                                                                355/30
2011/0080663 A1\* 4/2011 Arain ..................... G02B 26/06
                                                                359/820
2011/0249342 A1   10/2011 Scaggs

FOREIGN PATENT DOCUMENTS

JP         2013-524539       6/2013
JP            5737900       6/2015

\* cited by examiner

*Primary Examiner* — Mustak Choudhury
(74) *Attorney, Agent, or Firm* — Wenderoth, Lind & Ponack, L.L.P.

(57) ABSTRACT

A laser device includes a condensing assembly for condensing laser light output from a laser oscillator and a cover for accommodating the condensing assembly, the cover including protection windows permeable to the laser light on an optical path of the laser light. The protection windows include at least one first protection window having a positive refractive index temperature coefficient and at least one second protection window having a negative refractive index temperature coefficient, the at least one first protection window and the at least one second protection window being arranged along the optical path of the laser light.

16 Claims, 6 Drawing Sheets

FIG. 5

Table 1

|  | dn/dT ($10^{-6}$/°C) | $\beta$ ($10^{-6}$/°C) |
|---|---|---|
| Synthetic quartz | 10 | 0.52 |
| $CaF_2$ (fluorite) | -10.6 | 18.85 | dn/dT : Refractive index temperature coefficient
$\beta$ : Linear expansion coefficient

FIG. 6

Table 2 : Synthetic quartz physical property value

| Temperature | Specific heat $c_p$ | Heat conductivity k | Density $\rho$ |
|---|---|---|---|
| °C | J/(kgK) | W/(mmK) | kg/mm3 |
| 20 | 760 | 1.38E-03 | 2.20E-06 |
| 100 | 889 | 1.47E-03 | |
| 200 | 989 | 1.55E-03 | |
| 300 | 1055 | 1.67E-03 | |
| 400 | 1107 | 1.84E-03 | |
| 950 | 1250 | 2.68E-03 | |
| 1500 | 1250 | 2.68E-03 | |

FIG. 7

Table 3 : $CaF_2$ (fluorite) physical property value

| Temperature | Specific heat $c_p$ | Heat conductivity k | Density $\rho$ |
|---|---|---|---|
| °C | J/(kgK) | W/(mmK) | kg/mm3 |
| Room Temp. | 854 | 9.71E-03 | 3.18E-06 |

LASER DEVICE AND PROCESSING DEVICE

TECHNICAL FIELD

The present disclosure relates to a laser device and a processing device including the laser device.

BACKGROUND ART

A processing technology using laser light has put into practical use. A laser device includes a laser oscillator oscillating laser light, a condensing assembly condensing the laser light oscillated from the laser oscillator, and the like. The condensing assembly includes an optical lens transmitting and condensing the laser light, a mirror reflecting and condensing the laser light, or the like.

The optical lens and the mirror absorb energy of the laser light upon laser light irradiation, and raise in temperature. The problem arises in that the temperature increase may change a focal range of the laser light condensed by the condensing assembly. The temperature increase becomes large as the laser device has a higher output. The change in the focal range may deteriorate processing quality of a workpiece to be processed in a processing device using the laser light.

JP 2013-524539 A discloses a measure for suppressing a change in focal range owing to a temperature increase of an optical lens of a condensing assembly. The measure includes a plurality of lenses of the condensing assembly as a combination of a lens having a positive refractive index temperature coefficient and a lens having a negative refractive index temperature coefficient, and corrects a change in the focal range owing to a temperature increase of the positive lens by the negative lens, thereby suppressing the change in the focal range.

SUMMARY

The present inventors attempted the measure disclosed in JP 2013-524539 A in order to reduce the change in the focal range (to be also referred to as a "focal shift" hereinafter) owing to the temperature increase in the condensing assembly. However, the focal shift was not reduced as intended. It is therefore necessary to take other measures.

An object of one embodiment is to suppress a focal shift owing to a temperature increase of a condensing assembly or the like of a laser device.

(1) A laser device according to an embodiment includes a condensing assembly condensing laser light output from a laser oscillator and a cover for accommodating the condensing assembly, the cover including protection windows permeable to the laser light on an optical path of the laser light.

The protection windows include at least one first protection window having a positive refractive index temperature coefficient and at least one second protection window having a negative refractive index temperature coefficient, the first protection window and the second protection window being arranged along the optical path of the laser light.

The cover is provided to protect the condensing assembly. The condensing assembly is protected from smoke and a gas generated in a processing device using laser light, for example, a welding device. An opening is formed in a part of the cover through which the laser light is transmitted and in the opening, a protection window which is generally made of a material with a high laser light transmission and is formed into, for example, a plate-like shape is formed.

The present inventors found that it is impossible to suppress a focal shift as a whole even if a focal shift of the condensing assembly is suppressed because the same focal shift as the condensing assembly occurs when the laser light is transmitted through the protection window.

With the above configuration (1), since the protection windows have the first protection window having the positive refractive index temperature coefficient and the second protection window having the negative refractive index temperature coefficient along the optical path of the laser light, it is possible to correct and offset a focal shift owing to a refractive index change of the first protection window by a refractive index change of the second protection window during a temperature increasing process. Thus, it is possible to suppress the focal shift when the laser light passes through the protection windows. Therefore, it is possible to suppress quality deterioration of a workpiece processed by a processing device when the laser device is applied to the processing device.

(2) In an embodiment, in the above configuration (1), the at least one first protection window has a lower temperature diffusivity than the at least one second protection window, and the second protection window is larger in number than the first protection window.

The "temperature diffusivity" is a value defined by a thermal conductivity, a specific heat, and a density of a material, and is in proportion to the thermal conductivity, and is in inverse proportion to the density and the specific heat, as will be described later.

With the above configuration (2), since the first protection window has the lower temperature diffusivity than the second protection window, the first protection window has a higher temperature increasing rate even by absorbing the same amount of heat. In addition, since the first protection window has the higher temperature increasing rate, the first protection window has a larger refractive index change amount. On the other hand, a refractive index change amount owing to the temperature increase of a plurality of first protection windows or second protection windows is a sum of change amounts of individual protection windows. Therefore, since the individual first protection windows have the larger refractive index change amounts than the individual second protection windows but the number of second protection windows is larger than the number of first protection windows, a focal shift owing to the refractive index change of the first protection windows is offset by the refractive index change of the second protection windows.

(3) In an embodiment, in the above configuration (1), the at least one first protection window has a lower temperature diffusivity than the at least one second protection window, and the at least one second protection window is applied with a coating having a higher heat absorption rate than a coating to the at least one first protection window.

With the above configuration (3), since the first protection window has the lower temperature diffusivity than the second protection window, the first protection window has the higher temperature increasing rate and thus the larger refractive index change amount than the second protection window, as described above. On the other hand, since the coating having the higher heat absorption rate than the coating to the first protection window is applied to the second protection window, the temperature increasing rate increases due to heat absorption of the coating. Thus, a difference in temperature increasing rate between the first protection window and the second protection window is offset. Therefore, since the first protection window and the second protection window have the substantially equal absolute values of the refractive index temperature coefficients, it is possible to always suppress occurrence of the focal shift during the temperature increasing process.

(4) In an embodiment, in any one of the above configurations (1) to (3), when the at least one first protection window has an absolute value A of the refractive index temperature coefficient, and the at least one second protection window has an absolute value B of the refractive index temperature coefficient, a relation of $0.8B \leq A \leq 1.2B$ is satisfied.

With the above configuration (4), since the first protection window and the second protection window have the substantially equal absolute values of the refractive index temperature coefficients, it is possible to always suppress occurrence of the focal shift under the same-temperature condition.

(5) In an embodiment, in the above configuration (4), when the at least one first protection window has a thickness t1, and the at least one second protection window has a thickness t2, a relation of $0.8t1 \leq t2 \leq 1.2t1$ is satisfied.

With the above configuration (3), the first protection window and the second protection window have the substantially equal thicknesses, and thus have substantially equal heat capacities. Therefore, the first protection window and the second protection window have substantially equal temperature increasing rates. Since the first protection window and the second protection window have the substantially equal absolute values of the refractive index temperature coefficients, it is possible to always suppress occurrence of the focal shift during the temperature increasing process.

(6) In an embodiment, in the above configuration (1), the at least one first protection window has a lower temperature diffusivity than the at least one second protection window, the at least one second protection window and the at least one first protection window are the same in number, and when the at least one first protection window has a thickness t1, and the at least one second protection window has a thickness t2, a relation of $1.2t2 \leq t1$ is satisfied.

With the above configuration (6), since the first protection window has the lower temperature diffusivity than the second protection window, the first protection window has the higher temperature increasing rate and thus the larger refractive index change amount than the second protection window, as described above. On the other hand, since the same number of first protection windows and second protection windows are disposed, and the first protection windows have a larger thickness than the second protection windows, the first protection windows have a larger sum of heat capacities than the second protection windows. If the heat capacities are high, the temperature increasing rate decreases. Thus, the difference in temperature increasing rate between the first protection windows and the second protection windows is offset. Therefore, since the first protection window and the second protection window have the substantially equal absolute values of the refractive index temperature coefficients, it is possible to always suppress occurrence of the focal shift during the temperature increasing process.

(7) In an embodiment, in any one of the above configurations (1) to (6), the at least one first protection window has a lower temperature diffusivity than the at least one second protection window, and a refractive index change of the laser light owing to a temperature increase of the first protection window after the laser light is continuously output from the laser oscillator for a predetermined time is canceled by a refractive index change of the laser light owing to a temperature increase of the second protection window.

With the above configuration (7), since the first protection window has the lower temperature diffusivity than the second protection window, the first protection window has the higher temperature increasing rate even by absorbing the same amount of heat. However, the focal shift caused by the difference in temperature increasing rate is canceled by other elements, making it possible to suppress the focal shift during the temperature increasing process.

(8) In an embodiment, in any one of the above configurations (1) to (7), the at least one first protection window contains quartz, and the at least one second protection window contains fluorite.

With the above configuration (8), using quartz and fluorite each having a low refractive index and dispersibility and a high transmission with respect to laser light for the first protection window and the second protection window, it is possible to improve condensing performance of the laser light in the condensing assembly.

(9) In an embodiment, in the above configuration (8), the at least one first protection window is arranged to face an outer space of the cover, and the at least one second protection window is arranged to face an inner space of the cover.

When the laser device is used for a processing device such as a welding device, the protection window arranged to face the outer space of the cover is stained faster with smoke and a gas generated from a processing portion, and thus needs to be replaced faster.

With the above configuration (9), the first protection window containing quartz which is less expensive than fluorite is arranged on an outer side than the second protection window containing fluorite, avoiding a cost rise even if the first protection window is replaced frequently.

(10) In an embodiment, in any one of the above configurations (1) to (9), the cover includes an inlet-side protection window disposed in an inlet part where the laser light enters the condensing assembly and an outlet-side protection window disposed in an outlet part where the laser light is emitted from the condensing assembly.

With the above configuration (10), since it is possible to suppress the focal shift of the laser light by both the inlet-side protection window and the outlet-side protection window described above, it is possible to effectively suppress the focal shift of the whole laser device including the condensing assembly.

(11) A processing device according to an embodiment includes the laser device according to any one of the above configurations (1) to (10) and a processing portion processing a workpiece by using the laser light emitted from the laser device. With the above configuration (11), since the processing device includes the laser device having the above configuration, it is possible to suppress a focal shift of the laser light emitted from the laser device to the above-described processing portion. Thus, it is possible to suppress quality deterioration of a workpiece processed by the processing device.

According to some embodiments, it is possible to suppress the focal shift of the laser light owing to the temperature increase of the protection windows. Thus, it is possible to suppress quality deterioration of the workpiece processed by the processing device to which the laser device is applied.

BRIEF DESCRIPTION OF DRAWINGS

FIG. 5 is a table of physical property values of synthetic quartz and fluorite.

FIG. 6 is a table of dispersibility of synthetic quartz.

FIG. 7 is a table of physical property values of fluorite.

DETAILED DESCRIPTION

Figure 1:
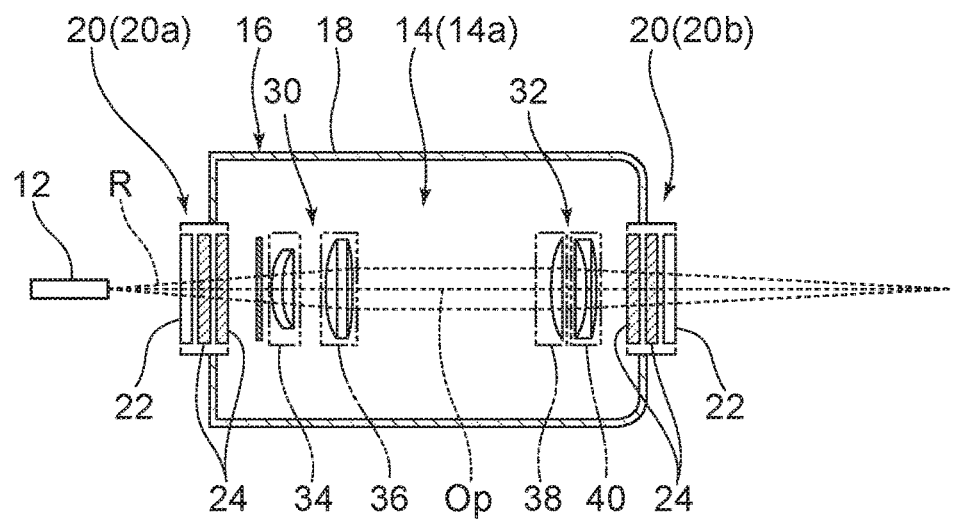
FIG. 1 is a partial cutting front view schematically showing a laser device according to an embodiment.

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", and "contain" are not intended to be exclusive of other components.

FIGS. 1 to 4 show laser devices 10 (10A, 10B, 10C, 10D) according to some embodiments.

In FIGS. 1 to 4, the laser devices 10 (10A to 10D) each include a laser oscillator 12 oscillating laser light R and a condensing assembly 14 (14a, 14b) condensing the laser light R oscillated from the laser oscillator 12. The laser light R condensed by the condensing assembly 14 is used to, for example, process a workpiece by a processing device. The laser device 10 also includes a cover 16 for protecting the condensing assembly 14. The condensing assembly 14 is accommodated in the cover 16. If the above-described processing device is, for example, a welding device, smoke and a gas are generated from a weld part. The cover 16 shuts off the smoke and the gas approaching the condensing assembly 14 to protect the condensing assembly 14. The cover 16 includes a cover body 18, and protection windows 20 (20a, 20b) disposed on an optical path Op of the laser light R so that the laser light R can be transmitted through the cover 16.

The condensing assembly 14 including an optical lens, a reflecting mirror, or the like absorbs energy of the laser light R upon laser light irradiation and raises the temperature. The temperature increase changes a focal range of the laser light R condensed by the condensing assembly 14. The temperature increase becomes large as the laser device 10 has a higher output. Accordingly, a focal shift amount also increases. The change in the focal range may deteriorate processing quality of the workpiece in the processing device to which the laser device 10 is applied.

Figure 12:
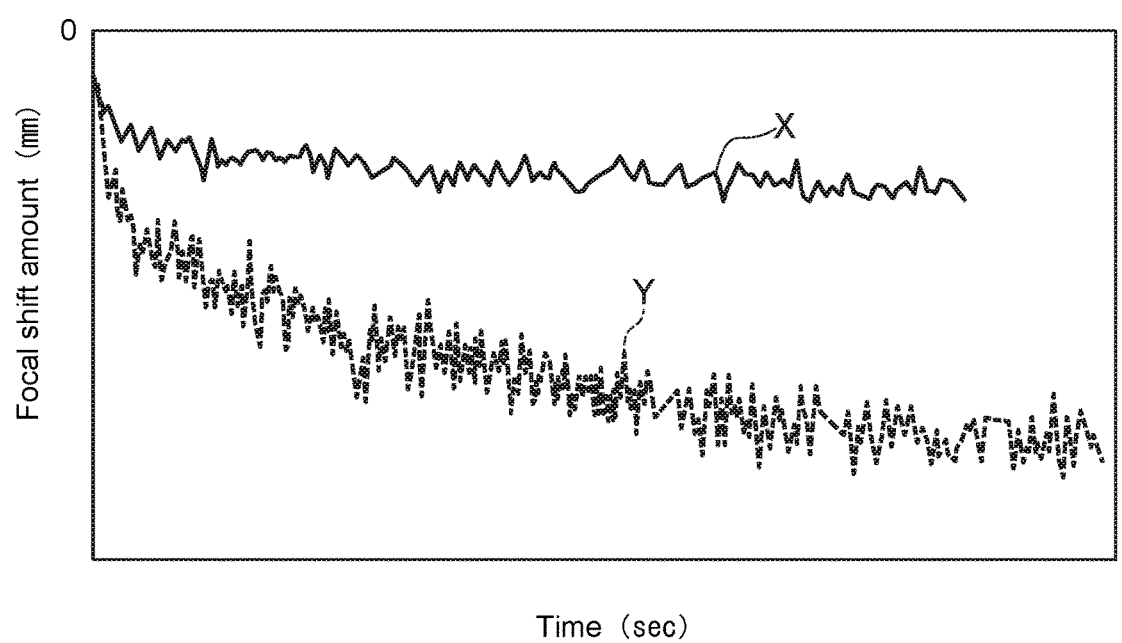
FIG. 12 is a graph of an example of a focal shift.

FIG. 12 is a graph of an example of a focal shift amount caused by the temperature increase. A line X indicates the focal shift amount for a 5-kW output of the laser device, and a line Y indicates the focal shift amount for a 20-kW output of the laser device. As can be seen from FIG. 12, the focal shift amount increases as the laser device has the higher output.

As described above, the present inventors fail to suppress the focal shift amount as intended even by suppressing the focal shift of the optical lens, the mirror, or the like of the condensing assembly 14.

The protection windows 20 (20a, 20b) shown in FIGS. 1 to 4 each include a first protection window 22 having a positive refractive index temperature coefficient and a second protection window 24 having a negative refractive index temperature coefficient. The protection windows are arranged along the optical path Op of the laser light R. The refractive index temperature coefficient refers to a refractive index change amount when a temperature changes by 1° C.

Similarly to the optical lens, the reflecting mirror, or the like of the condensing assembly 14, the protection windows 20 absorb the energy of the laser light R as the laser light R is transmitted and gradually raise the temperature. The temperature increase of the protection windows 20 changes the refractive index of the laser light R transmitted through the first protection window 22 and the second protection window 24. Since the first protection window 22 has the positive refractive index temperature coefficient, and the second protection window 24 has the negative refractive index temperature coefficient, the refractive index change of the laser light R transmitted through the protection windows 20 owing to the temperature increase of the first protection window 22 is corrected and offset by the second protection window 24. Thus, it is possible to suppress the focal shift when the laser light R is transmitted through the protection windows 20. Since it is possible to suppress the focal shift when the laser light R is transmitted through the protection windows 20 as described above, it is possible to suppress quality deterioration of the workpiece processed by the processing device when the laser device 10 is used for the processing device.

In an embodiment, the cover 16 has openings on wall surfaces facing the optical path Op of the laser light R, and the protection windows 20 are configured by providing, in the openings, plate-like bodies made of a material permeable to the laser light R.

Figure 3:
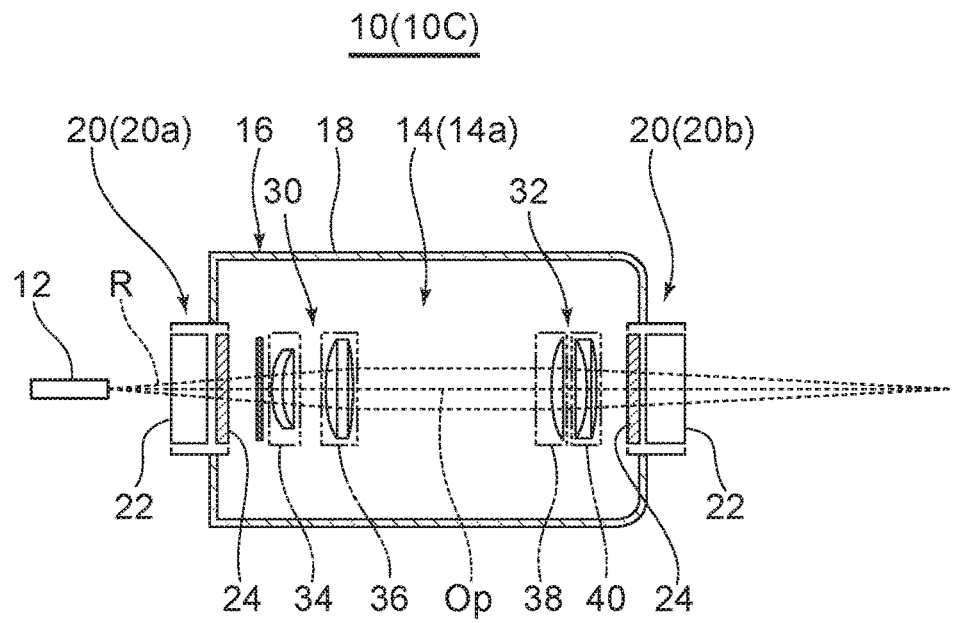
FIG. 3 is a partial cutting front view schematically showing a laser device according to an embodiment.

In an embodiment, in each of the laser devices 10 (10A, 10C) shown in FIGS. 1 and 3, the condensing assembly 14 (14a) includes first lenses 30 and second lenses 32. The first lenses 30 and the second lenses 32 are disposed to face the optical path Op, and the first lenses 30 are disposed on an upstream side of the second lenses 32. The first lenses 30 transmit and collimate the laser light R oscillated from the laser oscillator 12. The second lenses 32 transmit and condense the laser light R collimated by the first lenses 30.

In an embodiment, the first lenses 30 include a lens 34 having a positive refractive index temperature coefficient and a lens 36 having a negative refractive index temperature coefficient. Thus, it is possible to correct and offset a refractive index change owing to a temperature increase of the lens 34 absorbing the energy of the laser light R by a refractive index change owing to a temperature increase of the lens 36. Therefore, it is possible to suppress a focal shift when the laser light R passes through the first lenses 30. In addition, the second lenses 32 include a lens 38 having a positive refractive index temperature coefficient and a lens 40 having a negative refractive index temperature coefficient. Thus, it is possible to correct and offset a refractive index change owing to a temperature increase of the lens 38 absorbing the energy of the laser light R by a refractive index change owing to a temperature increase of the lens 40. Therefore, it is possible to suppress a focal shift when the laser light R passes through the second lenses 32.

According to the present embodiment, it is possible to suppress not only the focal shift when the laser light R is transmitted through the protection windows 20 but also the focal shift when the laser light R passes through the condensing assembly 14 (14a).

Figure 2:
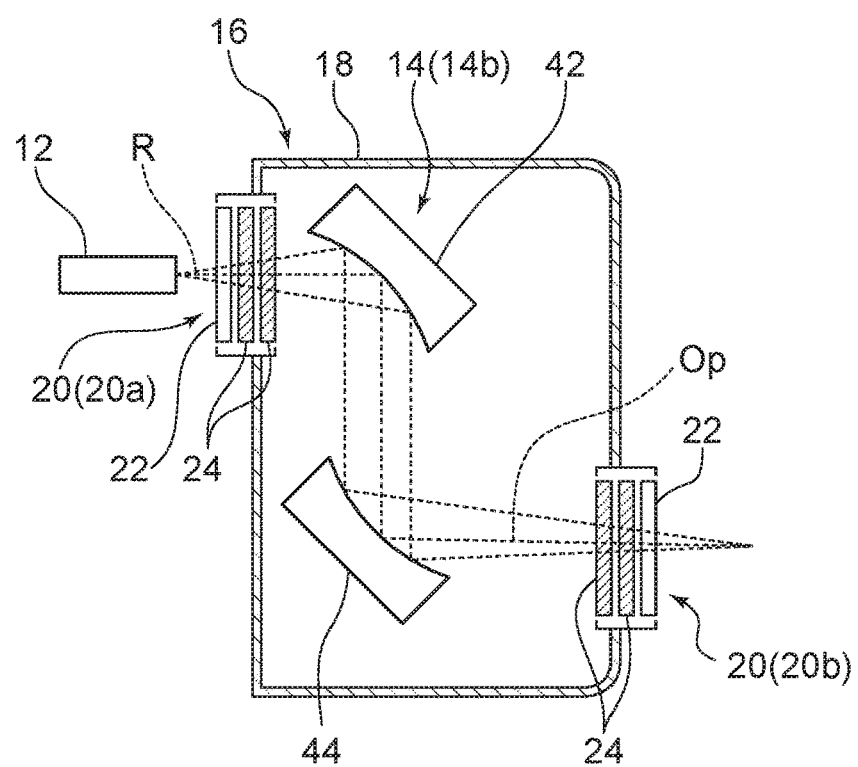
FIG. 2 is a partial cutting front view schematically showing a laser device according to an embodiment.
Figure 4:
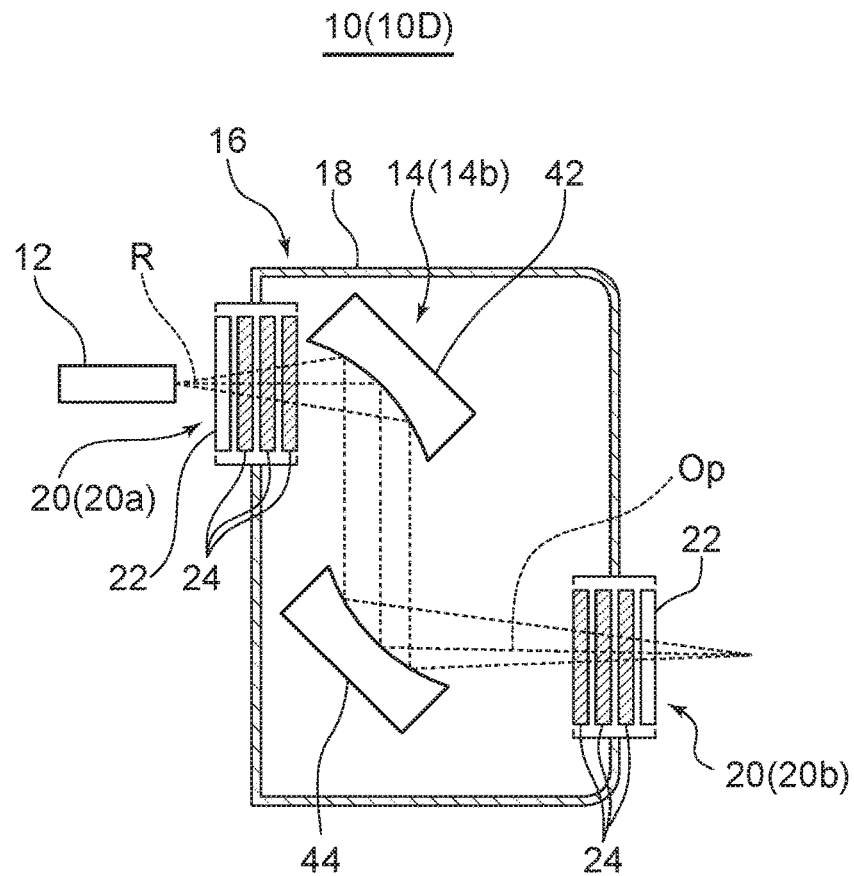
FIG. 4 is a partial cutting front view schematically showing a laser device according to an embodiment.

In an embodiment, in each of the laser devices 10 (10B, 10D) shown in FIGS. 2 and 4, the condensing assembly 14 (14b) includes a first mirror 42 for reflecting and collimating the laser light R oscillated from the laser oscillator 12, and a second mirror 44 for reflecting and condensing the laser light R collimated by the first mirror 42.

In an embodiment, the first mirror 42 and the second mirror 44 are formed by copper mirrors which are less likely to absorb the laser light R. Since the temperatures of the first mirror 42 and the second mirror 44 are less likely to increase, it is possible to suppress a focal shift owing to thermal deformation. Furthermore, it is possible to further suppress the thermal deformation by coating the surfaces of the first mirror 42 and the second mirror 44 with, for example, a dielectric multi-layer having a low absorption rate of the laser light R. Thus, it is possible to suppress the focal shift.

Therefore, it is possible to suppress not only the focal shift when the laser light R is transmitted through the protection windows 20 but also the focal shift when the laser light R passes through the condensing assembly 14 (14b).

In an embodiment, when the first protection window 22 has an absolute value A of the refractive index temperature coefficient, and the second protection window 24 has an absolute value B of the refractive index temperature coefficient, they are configured to satisfy a relation of $0.8B \leq A \leq 1.2B$, or preferably a relation of $0.9B \leq A \leq 1.1B$.

According to the present embodiment, since the first protection window 22 and the second protection window 24 have the substantially equal absolute values of the refractive index temperature coefficients, the focal shift caused by the refractive index change of the first protection window 22 is always offset by the refractive index change of the second protection window 24 under the same-temperature condition. Thus, it is possible to suppress the focal shift when the laser light R is transmitted through the protection windows 20.

In an embodiment, when the first protection window 22 and the second protection window 24 have the substantially equal absolute values of the refractive index temperature coefficients, the first protection window 22 has a thickness t1, and the second protection window 24 has a thickness t2, they are configured to satisfy a relation of $0.8t1 \leq t2 \leq 1.2t1$, or preferably a relation of $0.9t1 \leq t2 \leq 1.1t1$.

According to the present embodiment, the first protection window 22 and the second protection window 24 have the substantially equal thicknesses, and thus have substantially equal heat capacities. Therefore, the first protection window 22 and the second protection window 24 which absorb the energy of the laser light R and raise the temperature have substantially equal temperature increasing rates. In addition, since the first protection window 22 and the second protection window 24 have the substantially equal absolute values of the refractive index temperature coefficients, the focal shift caused by the refractive index change of the first protection window 22 is always offset by the refractive index change of the second protection window 24 during a temperature increasing process. Thus, it is possible to suppress the focal shift when the laser light R is transmitted through the protection windows 20.

In an embodiment, in the laser devices 10 (10A, 10B, 10D) shown in FIGS. 1, 2, and 4, the first protection window 22 has a lower temperature diffusivity than the second protection window 24, and the number of second protection windows 24 disposed along the optical path Op is larger than the number of first protection windows 22.

The "temperature diffusivity" is a physical property value used to obtain, for example, a temperature gradient of a steady state in a heat-transfer phenomenon and is defined by the following equation (unit; m²/s). From the following equation, a temperature diffusivity α is in proportion to a thermal conductivity k, and is in inverse proportion to a density ρ and a specific heat $c_p$.

$$\text{temperature diffusivity } \alpha = k/\rho \cdot c_p$$

where k represents the thermal conductivity ($Js^{-1} m^{-1} K^{-1}$), ρ represents the density ($kgm^{-3}$), and $c_p$ represents the specific heat ($Jkg^{-1} K^{-1}$).

According to the present embodiment, since the first protection window 22 has the lower temperature diffusivity than the second protection window 24, the first protection window 22 has a higher temperature increasing rate even by absorbing the same amount of heat. In addition, since the first protection window has the higher temperature increasing rate, the first protection window has a larger refractive index change amount. On the other hand, if each of the first protection window 22 and the second protection window 24 includes a plurality of protection windows, each of the refractive index change amounts of the first protection window 22 and the second protection window 24 owing to the temperature increase is a sum of change amounts of the individual protection windows. Therefore, since the number of second protection windows 24 is larger than the number of first protection windows 22, the second protection windows 24 have the larger sum of the change amounts than the first protection windows 22. Therefore, since the individual first protection windows 22 have the larger refractive index change amounts than the individual second protection windows 24 but the number of second protection windows 24 is larger than the number of first protection windows 22, the focal shift owing to the refractive index change of the first protection windows 22 is offset by the refractive index change of the second protection windows 24. Thus, it is possible to suppress the focal shift during the temperature increasing process.

In an embodiment, the first protection window 22 has the lower temperature diffusivity than the second protection window 24, and the first protection window 22 and the second protection window 24 are coated such that respective heat absorption amounts are decreased to suppress thermal deformation of the protection windows. Moreover, the second protection window 24 is applied with a coating having a higher heat absorption rate than a coating to the first protection window 22.

According to the present embodiment, since the first protection window 22 has the lower temperature diffusivity than the second protection window 24, the first protection window 22 has the higher temperature increasing rate and thus the larger refractive index change amount than the second protection window 24, as described above. On the other hand, since the coating having the higher heat absorption rate than the coating to the first protection window 22 is applied to the second protection window 24, the temperature increasing rate increases due to heat absorption of the coating. Therefore, a difference in temperature increasing rate between the first protection window 22 and the second protection window 24 is offset. Since the first protection window 22 and the second protection window 24 have the substantially equal absolute values of the refractive index temperature coefficients, it is possible to always suppress occurrence of the focal shift during the temperature increasing process.

In an embodiment, in the laser device 10 (10C) shown in FIG. 3, the first protection window 22 has the lower temperature diffusivity than the second protection window 24, and the same number of first protection windows 22 and second protection windows 24 are disposed along the optical path Op. Furthermore, the first protection windows 22 along the optical path Op are larger in thickness than the second protection windows 24. That is, when the first protection windows 22 have a thickness t1, and the second protection windows 24 have a thickness t2, a relation of 1.2t2≤t1 is satisfied. As an example, a relation of 1.5t2≤t1≤3.5t2 is satisfied.

According to the present embodiment, since the first protection window 22 has the lower temperature diffusivity than the second protection window 24, the first protection window 22 has the higher temperature increasing rate and thus the larger refractive index change amount than the second protection window 24, as described above. On the other hand, since the same number of first protection windows 22 and second protection windows 24 are disposed, and the first protection windows 22 have the larger thickness than the second protection windows 24, the first protection windows 22 have a larger sum of heat capacities than the second protection windows 24. If the heat capacities are high, the temperature increasing rate decreases. Thus, the difference in temperature increasing rate between the first protection windows 22 and the second protection windows 24 is offset. Therefore, since the first protection windows 22 and the second protection windows 24 have the substantially equal absolute values of the refractive index temperature coefficients, it is possible to always suppress occurrence of the focal shift during the temperature increasing process.

In an embodiment, the first protection window 22 has the lower temperature diffusivity than the second protection window 24. Then, a refractive index change of the laser light R owing to the temperature increase of the first protection window 22 after the laser light R is continuously output from the laser oscillator 12 for a predetermined time is canceled by a refractive index change of the laser light R owing to the temperature increase of the second protection window 24.

According to the present embodiment, since the first protection window 22 has the lower temperature diffusivity than the second protection window 24, the first protection window 22 has the higher temperature increasing rate even by absorbing the same amount of heat. However, the focal shift caused by the difference in temperature increasing rate is canceled by other elements, making it possible to suppress the focal shift during the temperature increasing process.

FIG. 5 shows refractive index temperature coefficients and linear expansion coefficients of synthetic quartz and fluorite. FIG. 6 (adapted from Shin-Etsu Quartz Products Co., Ltd. (technical guide to chemical physical property value PC-TG-CFC-006) and FIG. 7 (adapted from NEOTRON CO., LTD. (http://www.neotron.co.jp/crystal/4.html)) show physical property values of synthetic quartz and fluorite.

As shown in FIG. 5, synthetic quartz has the positive refractive index temperature coefficient, fluorite has the negative refractive index temperature coefficient, and they have substantially equal absolute values of the temperature coefficients. Therefore, it is possible to correct and offset the refractive index change owing to the temperature increase of the first protection window 22 containing synthetic quartz by the refractive index change owing to the temperature increase of the second protection window 24 containing fluorite. Thus, it is possible to suppress the focal shift when the laser light R passes through the protection windows 20.

As shown in FIG. 5, the linear expansion coefficients of synthetic quartz and fluorite are very different. Since fluorite has the large linear expansion coefficient, the heat capacity of the protection window containing fluorite increases as the temperature thereof increases, resulting in a gradual decrease in the temperature increasing rate. Considering the difference in physical property value, it is necessary to set the other elements (for example, the thickness, the number, and the like) of the protection window so that the temperature increasing rates become equal.

In an embodiment, the first protection window 22 contains quartz, and the second protection window 24 contains fluorite. As can be seen from FIGS. 6 and 7, synthetic quartz has about a third times lower temperature diffusivity than fluorite. Therefore, the second protection window 24 has about a third times higher temperature increasing rate than the first protection window 22. As the above embodiment, the difference in temperature increasing rate is offset by other elements such as the number of protection windows, a difference in absorption rate of the laser light of a coating layer coating a surface, and the like. Thus, it is possible to suppress the focal shift. For example, if the first protection window 22 and the second protection window 24 are equal in thickness, the number of second protection windows 24 is third times larger than the number of first protection windows 22. Alternatively, if the same number of first protection windows 22 and second protection windows 24 are disposed, the thickness t2 of the second protection windows 24 is third times larger than the thickness t1 of the first protection windows 22.

In addition, using quartz and fluorite each having a low refractive index and dispersibility and a high transmission with respect to laser light for the first protection window 22 and the second protection window 24, it is possible to suppress the temperature increase when the laser light is transmitted, and to suppress occurrence of the focal shift.

In an embodiment, as shown in FIGS. 1 to 4, the first protection window 22 containing quartz is arranged to face an outer space of the cover 16, and the second protection window 24 containing fluorite is arranged to face an inner space of the cover 16. That is, as shown in FIGS. 1 to 4, in the cover 16, the second protection window 24 is arranged on an inner side than the first protection window 22 along the optical path Op. In other words, compared with the first protection window 22, the second protection window 24 is arranged at a position closer to the condensing assembly 14 accommodated inside the cover 16.

When the laser device 10 is applied to the processing device, the protection window arranged to face the outer space of the cover is stained faster with smoke and a gas generated from a processing portion, and thus needs to be replaced faster.

According to the present embodiment, the first protection window 22 containing quartz which is less expensive than fluorite is arranged on an outer side than the second protection window 24 containing fluorite, avoiding a cost rise even if the first protection window 22 is replaced frequently.

In an embodiment, the cover 16 includes the inlet-side protection window 20 (20a) disposed in an inlet part where the laser light R enters the condensing assembly 14 and the outlet-side protection window 20 (20b) disposed in an outlet part where the laser light R is emitted from the condensing assembly 14.

According to the present embodiment, since the protection windows 20 are disposed in the inlet part and the outlet part of the condensing assembly 14, it is possible to suppress the focal shift of the laser light R by both the protection windows 20 (20a, 20b). Thus, it is possible to effectively suppress the focal shift of the whole laser device including the condensing assembly 14.

Figure 8:
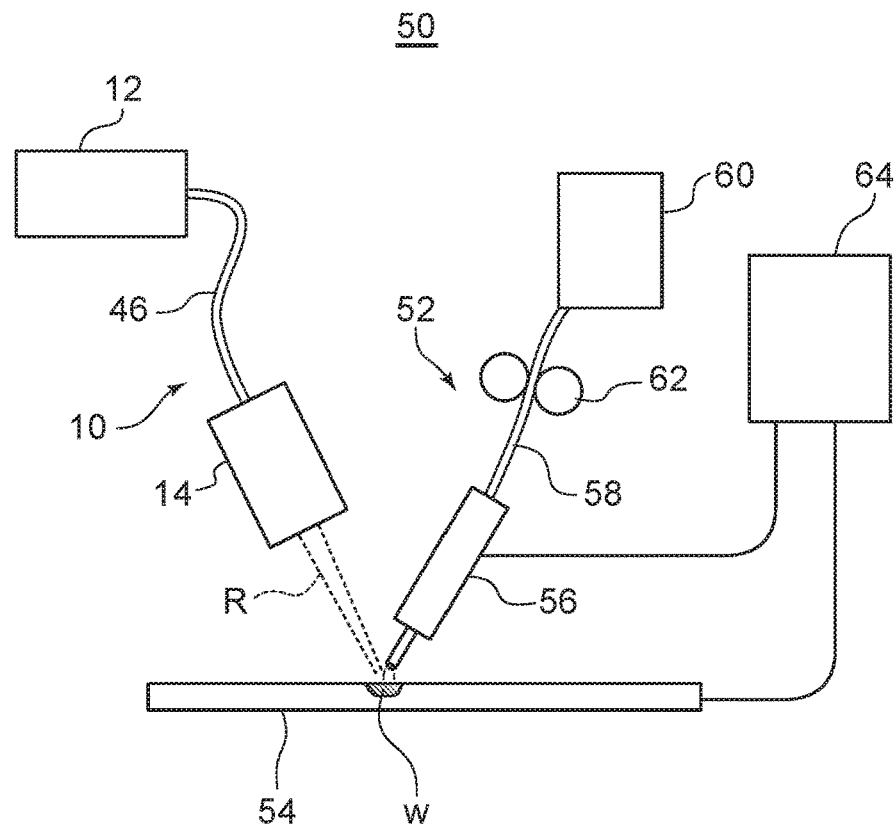
FIG. 8 is a configuration diagram schematically showing a processing device according to an embodiment.

As shown in FIG. 8, a processing device 50 according to an embodiment includes the laser device 10 and a processing portion 52 which processes a workpiece by using the laser light R emitted from the laser device 10. The processing portion 52 processes a workpiece 54 by using the laser light R emitted from the laser device 10. Since it is possible to suppress the focal shift of the laser light R emitted from the laser device 10, it is possible to suppress quality deterioration of the workpiece 54 processed by the processing portion 52. In addition, the laser device 10 does not need a device to correct the focal shift, it is possible to simplify the configuration of the laser device 10.

In an embodiment, the laser light R oscillated from the laser oscillator 12 is transmitted to the condensing assembly 14 via an optical fiber 46.

In an embodiment, the processing device 50 is a welding device for welding the workpiece 54. In the welding device, a welding torch 56 sends a welding wire 58 to a weld part w of the member 54 to be welded. The welding wire 58 is sent to the welding torch 56 from a wire supply device 60 by feed rolls 62. In a case of arc welding, a voltage is applied to the welding torch 56 and the member 54 to be welded from a power-supply device 64, and an arc is generated between the weld part w and the welding wire 58.

According to the present embodiment, since the laser device 10 can suppress the focal shift during an operation of the welding device 50, it is unnecessary to correct the focal shift. Thus, it is possible to integrate the optical fiber 46 with the condensing assembly 14 and to simplify the laser device 10.

Figure 9:
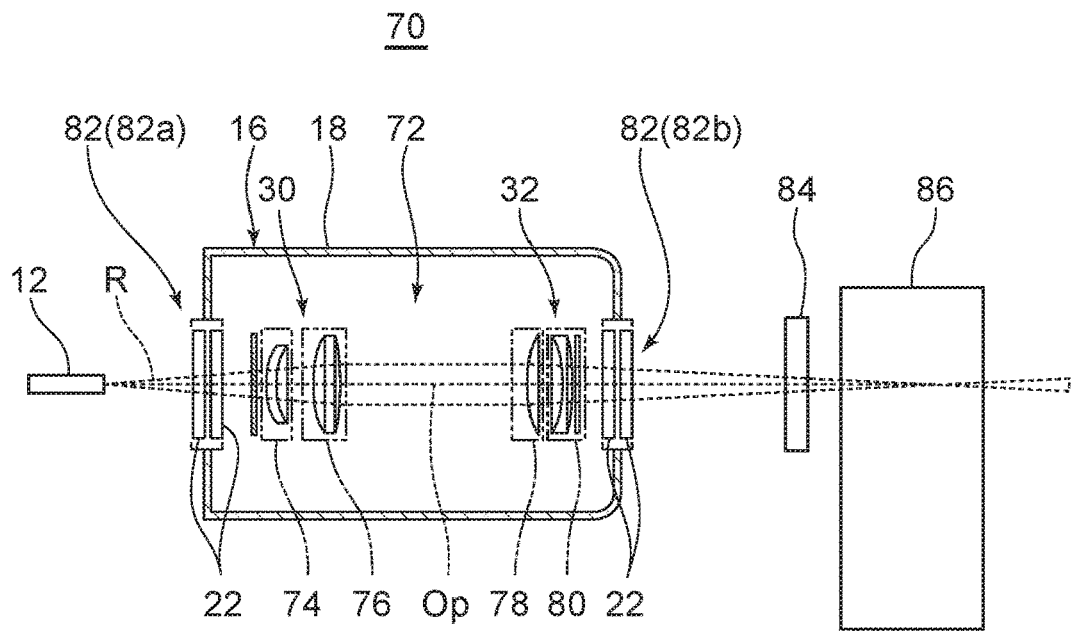
FIG. 9 is a partial cutting front view schematically showing a laser device used for an experiment.
Figure 10:
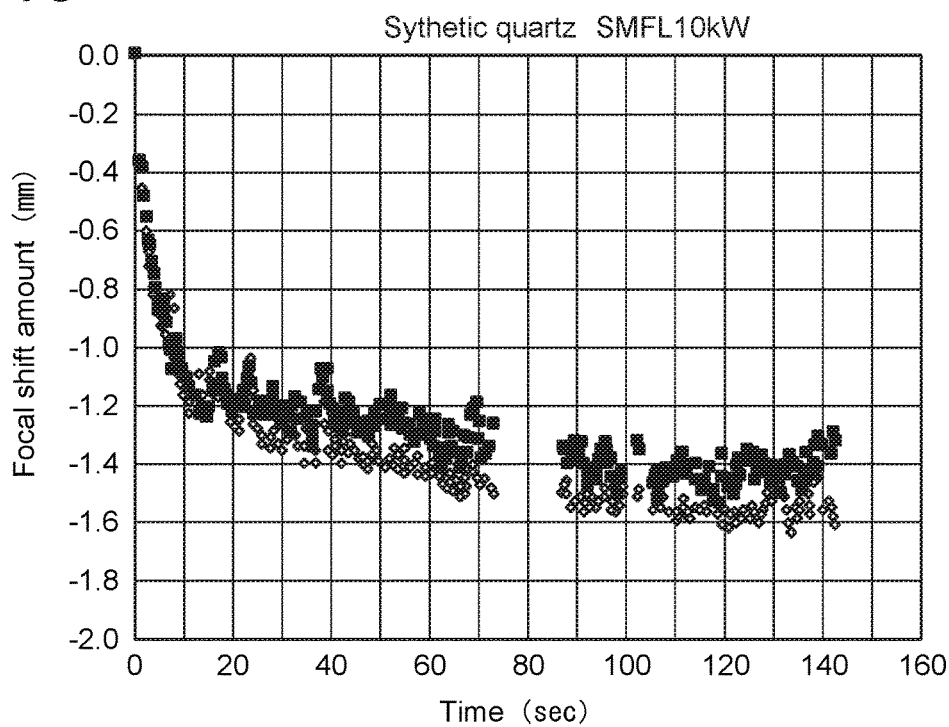
FIG. 10 is a graph showing an experiment result.
Figure 11:
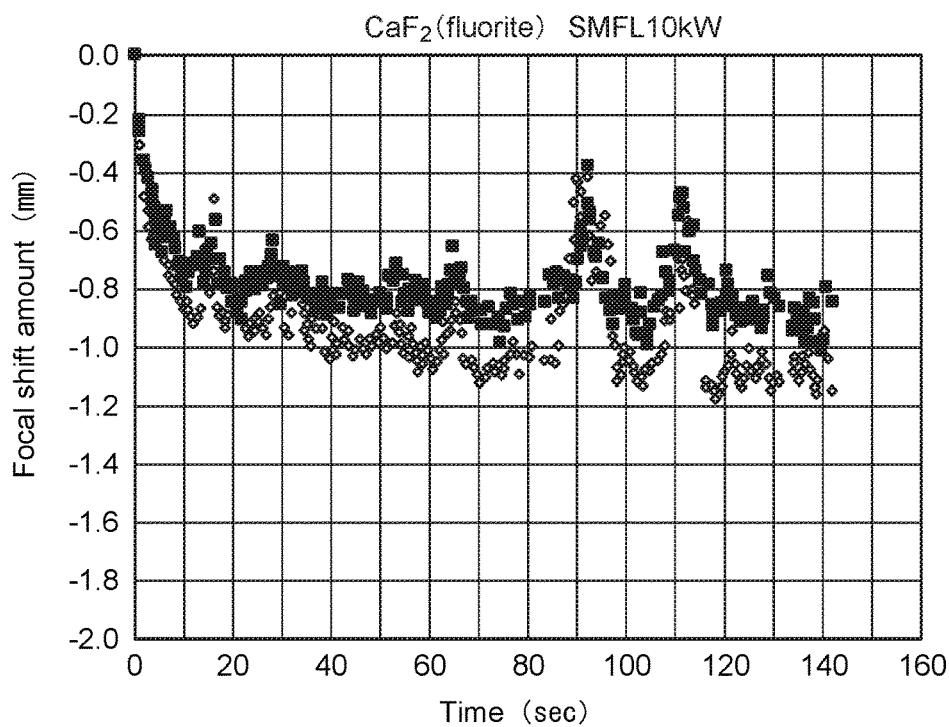
FIG. 11 is a graph showing an experiment result.

FIGS. 9 to 11 show one experimental example. FIG. 9 is a front view schematically showing the configuration of an experimental device 70 used for the experiment. In FIG. 9, the experimental device 70 includes a condensing assembly 72 inside the cover 16. The condensing assembly 72 includes the first lenses 30 for collimation and the second lenses 32 for condensing light. The first lenses 30 include lenses 74 and 76, and the second lenses 32 include lenses 78 and 80. The lenses 74, 76, 78, and 80 are all made of synthetic quartz. The cover 16 includes the cover body 18, and an inlet-side protection window 82 (82a) and an outlet-side protection window 82 (82b) disposed to face the optical path Op of the laser light R oscillated from the laser oscillator 12. The inlet-side protection window 82 (82a) is disposed in an inlet part of the condensing assembly 72 to face the optical path Op. The outlet-side protection window 82 (82b) is disposed in an outlet part of the condensing assembly 72 to face the optical path Op. The inlet-side protection window 82 (82a) and the outlet-side protection window 82 (82b) are made of synthetic quartz.

A protection window 84 is disposed at a position facing the optical path Op on a downstream side of the cover 16 and on an upstream side of a position where the laser light R is focused. A beam watcher 86 is disposed at a position where the laser light R is focused on a downstream side of the protection window 84. As the protection window 84, a synthetic-quartz-made protection window having a positive refractive index temperature coefficient and a fluorite-made protection window having a negative refractive index temperature coefficient are prepared. Then, a focal shift amount in a case in which the two types of protection windows are disposed respectively is measured. The beam watcher 86 can measure a focal range as seen in two directions; a direction orthogonal to the optical path Op and a direction orthogonal to each other. For example, the focal range as seen from above on a surface orthogonal to the optical path Op and as seen in the horizontal direction is measured.

As the experimental device 70, a laser device having the following specifications was used.
<Laser Device>
a single mode laser manufactured by IPG Photonics Corporation (output; 10 kW, wavelength; 1,070 nm)
quality of a beam entered from the laser oscillator 12; $M^2=1.5$
a diameter of the beam entered from the laser oscillator 12; 20 μm
a diameter of a beam passing through the protection window 84; about 30 to 50 μm
The protection windows 84 made of synthetic quartz and fluorite were respectively coated by 1,070 to 1,080 nm. The protection window 84 has the feature size of 60 mm in diameter×3 mm in thickness.

FIGS. 10 and 11 show results of the experiment. FIG. 10 shows the focal shift amount in a case in which the protection window made of synthetic quartz is used as the protection window 84. FIG. 11 shows the focal shift amount in a case in which the protection window made of fluorite is used as the protection window 84. In FIGS. 10 and 11, black points and void points respectively indicate the focal range as seen in the above-described two directions.

The focal shift amount shown in FIG. 10 was about 1.4 mm. The focal shift amount shown in FIG. 11 was about 0.9 mm. Therefore, it was confirmed that the focal shift was suppressed more effectively with an about 0.5-mm decrease in the focal shift amount in the case in which the protection window made of fluorite was used as the protection window 84 as compared with a case in which the protection window made of synthetic quartz was used as the protection window 84.

INDUSTRIAL APPLICABILITY

According to some embodiments, it is possible to suppress a focal shift of laser light owing to a temperature increase of a protection window. Thus, it is possible to suppress quality deterioration of a workpiece processed by a processing device using the laser light and to eliminate a device required to correct the focal shift. Therefore, it is possible to simplify a laser device.

The invention claimed is:

1. A laser device comprising:
a condensing assembly for condensing laser light output from a laser oscillator; and
a cover for accommodating the condensing assembly, the cover including protection windows permeable to the laser light on an optical path of the laser light,
wherein:
the protection windows include at least one first protection window having a positive refractive index temperature coefficient and at least one second protection window having a negative refractive index temperature coefficient, the at least one first protection window and the at least one second protection window being arranged along the optical path of the laser light;
the at least one first protection window has an absolute value A of the refractive index temperature coefficient;
the at least one second protection window has an absolute value B of the refractive index temperature coefficient; and
a relation of $0.8B \leq A \leq 1.2B$ is satisfied.

2. The laser device according to claim 1, wherein:
the at least one first protection window has a lower temperature diffusivity than the at least one second protection window; and
the at least one second protection window is larger in number than the at least one first protection window.

3. The laser device according to claim 1, wherein:
the at least one first protection window has a lower temperature diffusivity than the at least one second protection window; and
the at least one second protection window is applied with a coating having a higher heat absorption rate than a coating applied to the at least one first protection window.

4. The laser device according to claim 1, wherein:
the at least one first protection window has a thickness t1;
the at least one second protection window has a thickness t2; and
a relation of $0.8t1 \leq t2 \leq 1.2t1$ is satisfied.

5. The laser device according to claim 1, wherein:
the at least one first protection window has a lower temperature diffusivity than the at least one second protection window; and
a refractive index change of the laser light owing to a temperature increase of the at least one first protection window after the laser light is continuously output from the laser oscillator for a predetermined time is canceled by a refractive index change of the laser light owing to a temperature increase of the at least one second protection window.

6. The laser device according to claim 1,
wherein the at least one first protection window contains quartz, and the at least one second protection window contains fluorite.

7. The laser device according to claim 6,
wherein the at least one first protection window faces outside the cover, and the at least one second protection window faces inside the cover.

8. The laser device according to claim 1,
wherein the protection windows include an inlet-side protection window in an inlet part where the laser light is to enter the condensing assembly and an outlet-side protection window in an outlet part where the laser light is to be emitted from the condensing assembly.

9. A processing device comprising:
the laser device according to claim 1; and
a processing portion for processing a workpiece by using the laser light emitted from the laser device.

10. A laser device comprising:
a condensing assembly for condensing laser light output from a laser oscillator; and
a cover for accommodating the condensing assembly, the cover including protection windows permeable to the laser light on an optical path of the laser light,
wherein:
the protection windows include at least one first protection window having a positive refractive index temperature coefficient and at least one second protection window having a negative refractive index temperature coefficient, the at least one first protection window and the at least one second protection window being arranged along the optical path of the laser light;
the at least one first protection window has a lower temperature diffusivity than the at least one second protection window;
the at least one second protection window and the at least one first protection window are the same in number;
the at least one first protection window has a thickness t1;
the at least one second protection window has a thickness t2; and
a relation of $1.2t2 \leq t1$ is satisfied.

11. The laser device according to claim 10,
wherein the at least one second protection window is applied with a coating having a higher heat absorption rate than a coating applied to the at least one first protection window.

12. The laser device according to claim 10,
wherein a refractive index change of the laser light owing to a temperature increase of the at least one first protection window after the laser light is continuously output from the laser oscillator for a predetermined time is canceled by a refractive index change of the laser light owing to a temperature increase of the at least one second protection window.

13. The laser device according to claim 10,
wherein the at least one first protection window contains quartz, and the at least one second protection window contains fluorite.

14. The laser device according to claim 13,
wherein the at least one first protection window faces outside the cover, and the at least one second protection window faces inside the cover.

15. The laser device according to claim 10,
wherein the protection windows include an inlet-side protection window in an inlet part where the laser light is to enter the condensing assembly and an outlet-side protection window in an outlet part where the laser light is to be emitted from the condensing assembly.

16. A processing device comprising:
the laser device according to claim 10; and
a processing portion for processing a workpiece by using the laser light emitted from the laser device.

* * * * *